US008140084B2

(12) United States Patent
Jung et al.

(10) Patent No.: US 8,140,084 B2
(45) Date of Patent: Mar. 20, 2012

(54) APPARATUS AND METHOD FOR ALLOCATING CHANNEL QUALITY INFORMATION (CQI) CHANNEL IN WIRELESS COMMUNICATION SYSTEM

(75) Inventors: Young-Ho Jung, Suwon-si (KR); Cheol-Woo You, Seoul (KR); Sang-Min Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1051 days.

(21) Appl. No.: 11/928,821

(22) Filed: Oct. 30, 2007

(65) Prior Publication Data

US 2008/0102850 A1 May 1, 2008

(30) Foreign Application Priority Data

Oct. 30, 2006 (KR) .................. 10-2006-0105560

(51) Int. Cl.
*H04W 72/00* (2009.01)
(52) U.S. Cl. ........ 455/450; 455/509; 370/329; 370/330; 370/431
(58) Field of Classification Search .......... 370/329–330, 370/347, 431; 455/450–454, 509
See application file for complete search history.

(56) References Cited

U.S. PATENT DOCUMENTS

| | | | | |
|---|---|---|---|---|
| 2005/0191965 A1* | 9/2005 | Yu et al. | ..................... | 455/67.16 |
| 2005/0201474 A1* | 9/2005 | Cho et al. | ..................... | 375/260 |
| 2006/0013185 A1* | 1/2006 | Seo et al. | ..................... | 370/343 |
| 2006/0120470 A1* | 6/2006 | Hwang et al. | ................. | 375/260 |
| 2006/0223449 A1* | 10/2006 | Sampath et al. | ................ | 455/69 |
| 2007/0047502 A1* | 3/2007 | Marinier et al. | ............. | 370/335 |
| 2007/0155392 A1* | 7/2007 | Cho et al. | ..................... | 455/450 |
| 2007/0171849 A1* | 7/2007 | Zhang et al. | ................. | 370/310 |
| 2007/0230324 A1* | 10/2007 | Li et al. | ......................... | 370/204 |
| 2007/0274253 A1* | 11/2007 | Zhang et al. | ................. | 370/328 |
| 2008/0057969 A1* | 3/2008 | Agami et al. | ................. | 455/450 |
| 2008/0119213 A1* | 5/2008 | Ihm et al. | ..................... | 455/507 |

FOREIGN PATENT DOCUMENTS

WO   WO 2006/107835   10/2006

* cited by examiner

*Primary Examiner* — Kent Chang
*Assistant Examiner* — Marcus Hammonds
(74) *Attorney, Agent, or Firm* — The Farrell Law Firm, P.C.

(57) ABSTRACT

Apparatus and method for allocating a Channel Quality Information CHannel (CQICH) in a wireless communication system are provided. The method includes determining CQICH patterns required for users using information of one or more users to which CQICH resources are to be allocated, and selecting a CQICH pattern block, including all of the determined CQICH patterns, from among a plurality of pre-generated CQICH pattern blocks; and allocating CQICH sub-blocks corresponding to the users' required CQICH patterns using resource layout information of the CQICH sub-blocks corresponding to the CQICH patterns of the selected CQICH pattern block, and transmitting CQICH allocation information to a Mobile Station (MS).

19 Claims, 5 Drawing Sheets

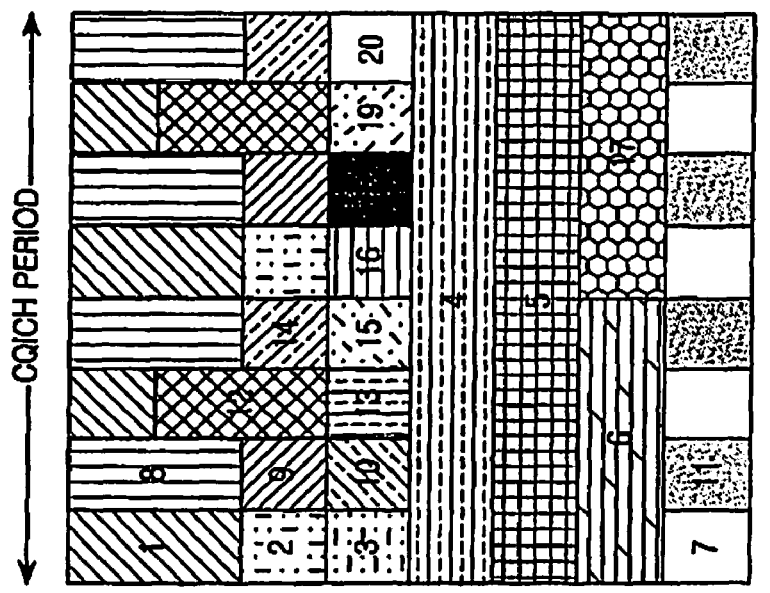
FIG. 5B PATTERN 2
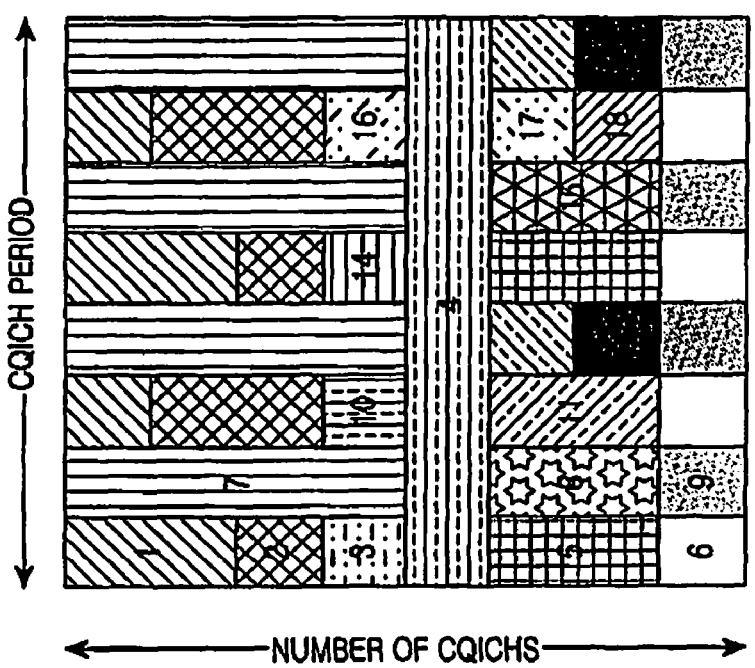
FIG. 5A PATTERN 1

APPARATUS AND METHOD FOR ALLOCATING CHANNEL QUALITY INFORMATION (CQI) CHANNEL IN WIRELESS COMMUNICATION SYSTEM

PRIORITY

This application claims priority under 35 U.S.C. §119(a) to an application filed in the Korean Intellectual Property Office on Oct. 30, 2006 and assigned Serial No. 2006-105560, the contents of which are herein incorporated by reference.

BACKGROUND OF THE INVENTION

1. Field of the Invention

The present invention relates generally to a wireless communication system, and in particular, to an apparatus and method for allocating Channel Quality Information CHannel (CQICH).

2. Description of the Related Art

Wireless access specifications based on a Orthogonal Frequency Division Multiple Access (OFDMA scheme), such as Institute of Electrical and Electronics Engineers (IEEE) 802.16e, IEEE 802.20, and IEEE 802.11n, which is recently under consideration, are taking into account Channel Quality Information (CQI) fed back from a terminal to determine a transmit mode and a transmit rate fit for a channel condition of a scheduled user.

A CQI CHannel (CQICH) is an uplink channel for feeding back the CQI. If a plurality of users utilizes a fixed resource like a data channel, a Base Station (BS) informs the users of resource allocation information of the data channel. Likewise, the BS needs to transmit CQICH resource allocation information to the users. Similar to the resource allocation of the data channel, the CQICH resource allocation information should be transmitted such that every user in a cell can receive the information. To this end, it is important to reduce the amount of the information required for the CQICH allocation.

A current IEEE 802.16e system informs each user of CQICH resource allocation information such as a user IDentification (CQICH_ID), a number of CQICH resources allocated to the corresponding user (CQICH_num), an allocation position (allocation index), an allocation period, and an allocation duration, using separate fields of messages used for the CQICH allocation. For doing so, the current system requires a great deal of downlink broadcast channel resources for the CQICH allocation because the CQICH allocation requires a great deal of information, and the system should inform every user of the information at every CQICH allocation period. As a result, overhead caused by the CQICH allocation is problematic.

SUMMARY OF THE INVENTION

An aspect of the present invention is to substantially solve at least the above problems and/or disadvantages and to provide at least the advantages below. Accordingly, an aspect of the present invention is to provide an apparatus and method for allocating a CQICH in a wireless communication system.

Another aspect of the present invention is to provide an apparatus and method for reducing an amount of CQICH allocation information using a CQICH segmentation pattern in a wireless communication system.

A further aspect of the present invention is to provide an apparatus and method for patterning CQICH resources in advance by reflecting a required CQICH pattern for each operation mode and transmitting a greater deal of information of the CQICH allocation with a single index to a terminal.

The above aspects are achieved by providing a method for allocating a CQICH of a Base Station (BS) in a wireless communication system, which includes determining CQICH patterns required for users using information of one or more users to which CQICH resources are to be allocated, and selecting a CQICH pattern block including all of the determined CQICH patterns among a plurality of pre-generated CQICH pattern blocks; and allocating CQICH sub-blocks corresponding to the users' required CQICH patterns using resource layout information of the CQICH sub-blocks corresponding to the CQICH patterns of the selected CQICH pattern block, and transmitting CQICH allocation information to a Mobile Station (MS).

According to one embodiment of the present invention, a CQI feedback method of an MS in a wireless communication system includes receiving CQI CHannel (CQICH) allocation information from a BS; when a CQICH pattern block index of the CQICH allocation information is different from a previous CQICH pattern block index, reading CQICH pattern resource layout information corresponding to the received CQICH pattern block index from a CQICH pattern storage memory; and mapping a CQI message to an allocated CQICH according to the read information and the CQICH allocation information.

According to another embodiment of the present invention, an apparatus for allocating a CHICH of a BS in a wireless communication system includes a CQICH pattern storage memory for storing resource layout information of CQICH patterns based on CQICH pattern blocks; and a controller for determining CQICH patterns required for users using information of one or more users to which a CQICH resources is to be allocated, selecting one CQICH pattern block including all of the determined CQICH patterns from a plurality of pre-generated CQICH pattern blocks, reading resource layout information of CQICH sub-blocks corresponding to CQICH patterns of the selected CQICH pattern block from the CQICH pattern storage memory, and allocating the CQICH sub-blocks corresponding to the CQICH patterns required for the users using the read information.

According to yet another embodiment of the present invention, a CQI feedback apparatus of a Mobile Station (MS) in a wireless communication system includes a CQICH pattern storage memory for storing CQICH pattern resource layout information based on CQICH pattern blocks; a controller for receiving CQICH allocation information from a BS, when a CQICH pattern block index of the CQICH allocation information is different from a previous CQICH pattern block index, reading CQICH pattern resource layout information corresponding to the received CQICH pattern block index from the CQICH pattern storage memory, and outputting the read information and the CQICH allocation information; and a CQICH message generator for mapping a CQI message to an allocated CQICH according to the read information and the CQICH allocation information.

BRIEF DESCRIPTION OF THE DRAWINGS

The above and other objects, features and advantages of the present invention will become more apparent from the following detailed description when taken in conjunction with the accompanying drawings in which:

FIGS. 5A and 5B are diagrams of a CQICH pattern block generation method in the wireless communication system according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for allocating a Channel Quality Information CHannel (CQICH) in a wireless communication system.

In the following explanation, an operation mode can be a channel coding type, a coding rate, a modulation scheme, a packet length, a Hybrid Automatic Repeat reQuest (H-ARQ) type, a Multiple Input Multiple Output (MIMO) scheme, etc.

Figure 1:
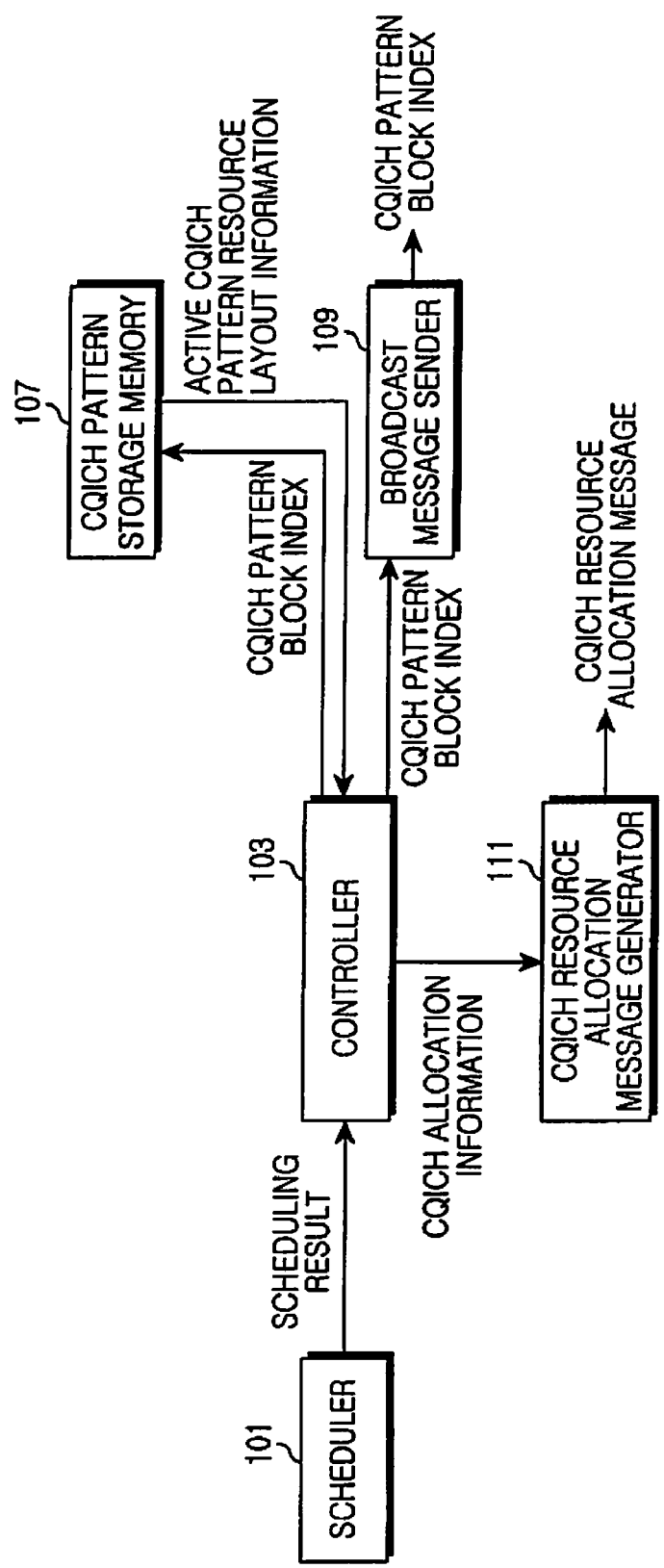
FIG. 1 is a block diagram of a CQICH allocation apparatus of a Base Station (BS) in a wireless communication system according to the present invention.

FIG. 1 is a block diagram of a CQICH allocation apparatus of a Base Station (BS) in a wireless communication system according to the present invention. The CQICH allocation apparatus includes a scheduler 101, a controller 103, a CQICH pattern storage memory 107, a broadcast message sender 109, and a CQICH resource allocation message generator 111.

The scheduler 101 of FIG. 1 schedules to select users to be allocated CQICH and outputs the scheduling result.

The controller 103 calculates a number of patterns required for the operation modes using information relating to the selected users, e.g., using operation mode information of the corresponding users according to the scheduling result input from the scheduler 101, and selects one of pre-generated CQICH pattern blocks using the calculation result. Herein, the CQICH pattern block index according to the selection is fixed for a long term. Thus, the BS does not need to frequently transmit the CQICH pattern block index to Mobile Stations (MSs). When the CQICH pattern block index is output to the broadcast message sender 109, if a change of the pattern block index is required or on a periodic basis, the determined CQICH pattern block can be sent to the MSs. The controller 103 reads resource layout information of sub-blocks constituting an active CQICH pattern of the CQICH pattern block index according to the selection, from the CQICH pattern storage memory 107, allocates the sub-blocks of the CQICH pattern block to users using the read active CQICH pattern resource layout information, and outputs user CQICH allocation information to the CQICH resource allocation message generator 111.

The CQICH pattern storage memory 107 contains the resource layout information of the CQICH pattern constituting the corresponding CQICH pattern block for each CQICH pattern block index, and outputs active CQICH pattern resource layout information corresponding to a specific CQICH pattern block index to the controller 103 under the control of the controller 103.

The broadcast message sender 109 broadcasts the CQICH pattern block index fed from the controller 103 using a separate downlink broadcast channel.

The CQICH resource allocation message generator 111 generates a CQICH resource allocation message using the CQICH allocation information of the selected user, which is input from the controller 103, and transmits the generated CQICH resource allocation message to the MS.

Figure 2:
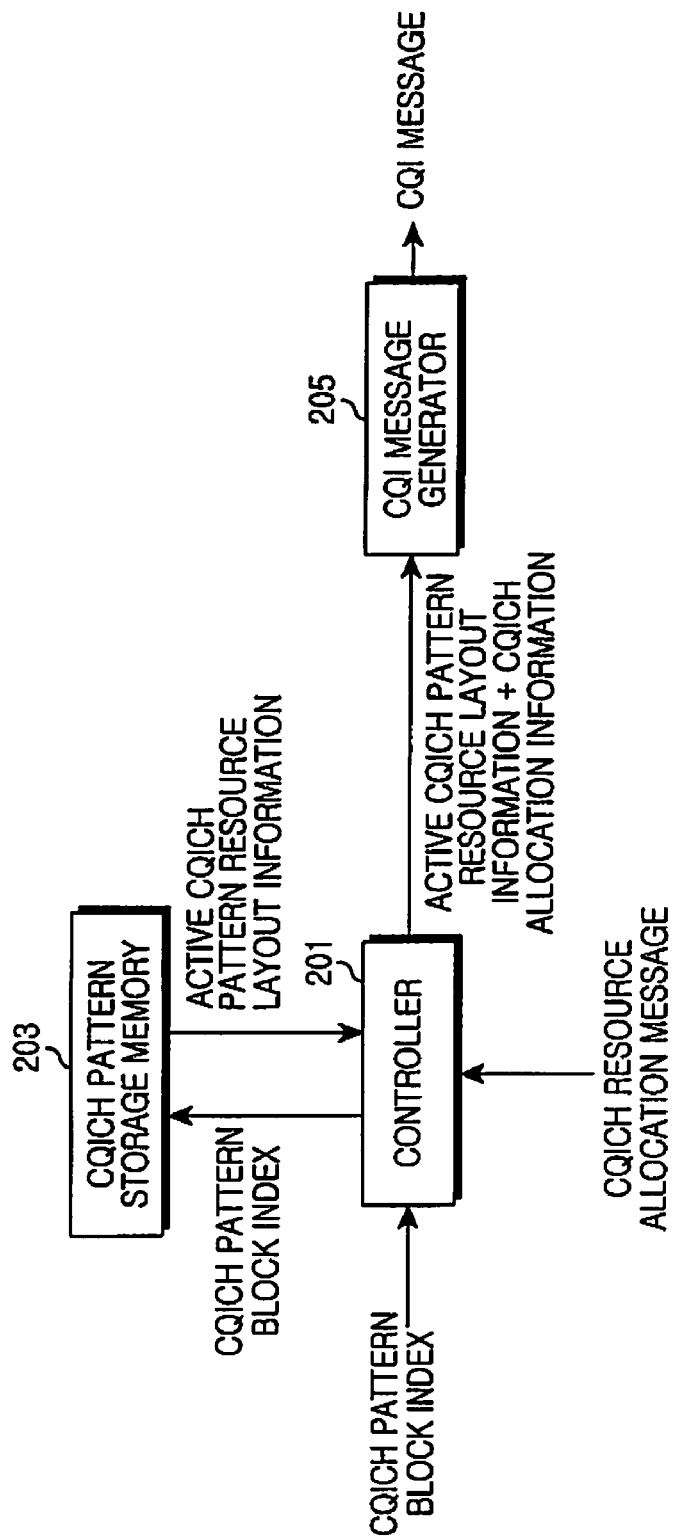
FIG. 2 is a block diagram of a CQI feedback apparatus of a Mobile Station (MS) in the wireless communication system according to the present invention.

FIG. 2 is a block diagram of a CQI feedback apparatus of an MS in the wireless communication system according to the present invention. The CQI feedback apparatus includes a controller 201, a CQICH pattern storage memory 203, and a CQI message generator 205.

Upon receiving the CQICH pattern block index over the downlink broadcast channel, the controller 201 of FIG. 2 examines whether the received CQICH pattern block index matches a previously received CQICH pattern block index. When the two CQICH pattern block indexes do not match, the controller 201 reads active CQICH pattern resource layout information of the received CQICH pattern block index from the CQICH pattern storage memory 203. When receiving the CQICH resource allocation message including the other CQICH allocation information, excluding the CQICH pattern block index, from the BS, the controller 201 outputs the current active CQICH pattern resource layout information and the CQICH allocation information of the received CQICH resource allocation message to the CQI message generator 205.

The CQICH pattern storage memory 203 contains resource layout information of the CQICH patterns based on the CQICH pattern block indexes, and outputs active CQICH pattern resource layout information corresponding to a specific CQICH pattern block index to the controller 201 under the control of the controller 201.

The CQI message generator 205 generate a CQI message including CQI information, and transmits the generated CQI message to the BS by mapping the generated CQI message to the allocated CQICH according to the active CQICH pattern resource layout information and the CQICH allocation information fed from the controller 201.

Figure 3:
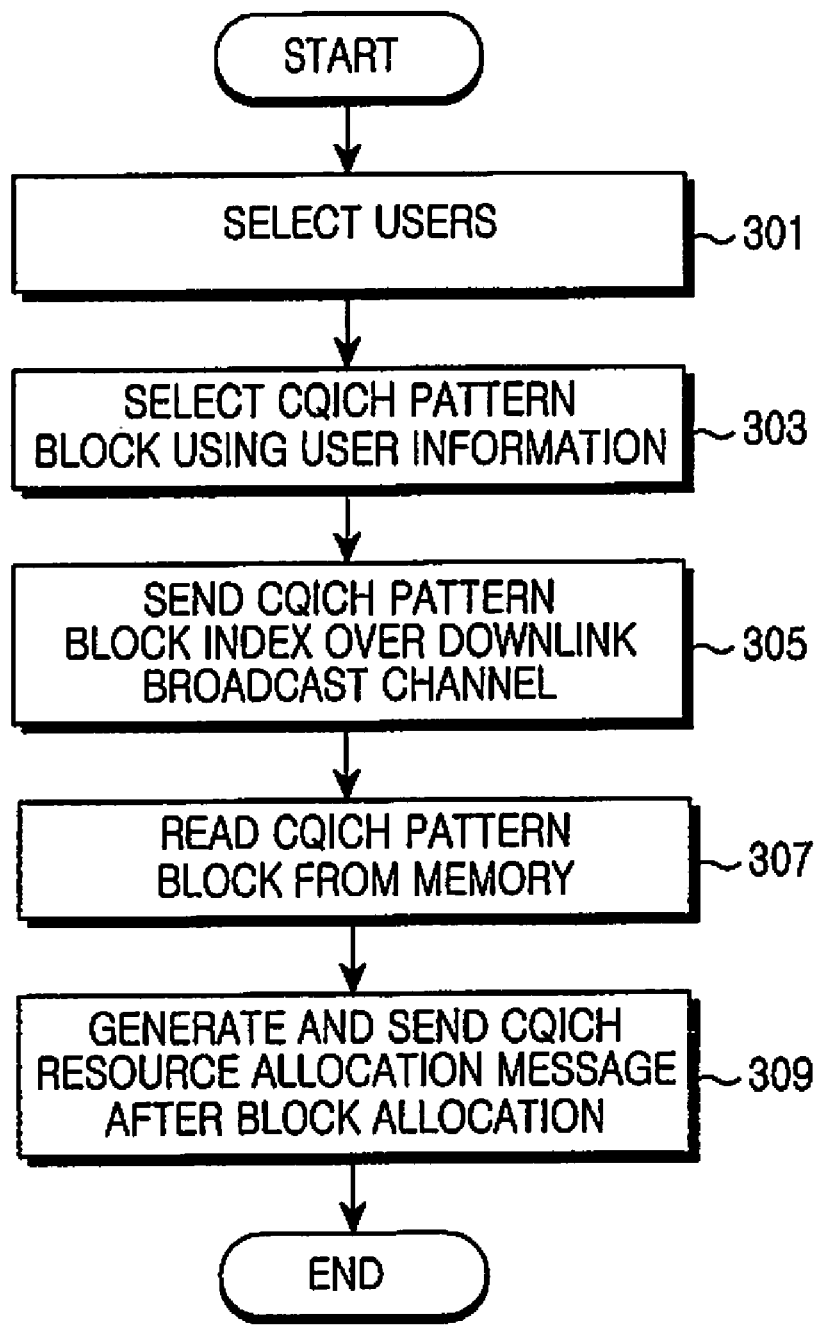
FIG. 3 is a flowchart of a CQICH allocation method of the BS in the wireless communication system according to the present invention.

FIG. 3 is a flowchart of a CQICH allocation method of the BS in the wireless communication system according to the present invention.

In FIG. 3, the BS selects users to be allocated CQICH resources through the scheduling in step 301. In step 303, the BS calculates a number of patterns required for each operation mode using information of the selected users, e.g., using operation mode information of the corresponding users, and selects one of pre-generated CQICH pattern blocks using the calculation result. In step 305, the BS transmits the selected CQICH pattern block index to the users over the downlink broadcast channel when the CQICH pattern block index needs to change or on a periodic basis. Therefore, the inflexibility of the CQICH allocation can be addressed. The generation of the CQICH pattern block will be described in more detail by referring to FIGS. 5A and 5B.

In step 307, the BS reads resource layout information of CQICH sub-blocks constituting the active CQICH pattern of the selected CQICH pattern block index, from the CQICH pattern storage memory 107. Next, in step 309, the BS allocates the sub-blocks of the CQICH pattern block to the selected users using the read active CQICH pattern resource layout information, generates a CQICH resource allocation message using a primary index which is mapped to the CQICH sub-blocks in relation to the user CQICH allocation information, i.e., using a CQICH index, and then transmits the generated message to the MS.

The CQICH resource allocation message includes a user ID, a CQICH ID, a CQICH index for distinguishing the sub-block allocated to the corresponding user in the selected CQICH pattern block, a feedback type signifying the information to be transmit over the allocated CQICH, a CQICH type signifying the mapping scheme of the information to the allocated CQICH, and a transmission duration signifying how long the corresponding pattern is transmitted. Note that various bitwise options can be included.

After step 309, the BS finishes the CQICH allocation process.

Figure 4:
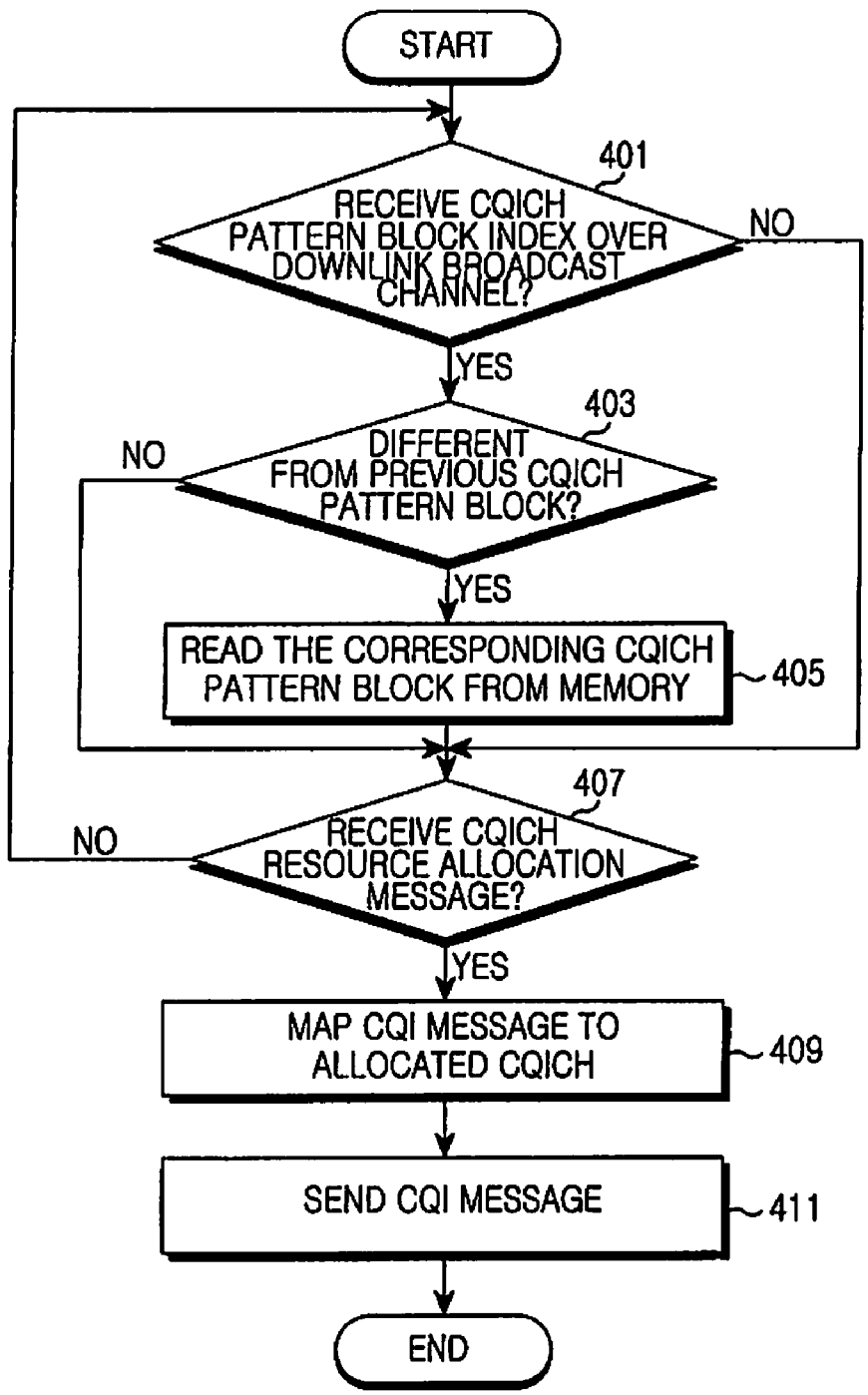
FIG. 4 is a flowchart of a CQI feedback method of the MS in the wireless communication system according to the present invention.

FIG. 4 is a flowchart of a CQI feedback method of the MS in the wireless communication system according to the present invention.

In FIG. 4, the MS determines whether a CQICH pattern block index is received over the downlink broadcast channel in step 401. Upon receiving the CQICH pattern block index, the MS examines whether the received CQICH pattern block index matches the previously received CQICH pattern block index in step 403. When the two pattern block indexes do not match, the MS reads active CQICH pattern resource layout information corresponding to the received CQICH pattern block index from the CQICH pattern storage memory 203 in step 405. In step 407, the MS determines whether a CQICH resource allocation message including the other CQICH allocation information, excluding the CQICH pattern block index, is received from the BS.

By contrast, when the CQICH pattern block index is not received in step 401 or when the two pattern block indexes are identical in step 403, the MS determines whether a CQICH resource allocation message is received from the BS in step 407.

Receiving the CQICH resource allocation message from the BS in step 407, the MS maps a CQI message including CQI information to the allocated CQICH according to the CQICH allocation information of the CQICH resource allocation message and the active CQICH pattern resource layout information in step 409. In step 411, the MS transmits the CQI message to the BS. By contrast, when no CQICH resource allocation message is received from the BS in step 407, the MS returns to step 401.

After step 411, the MS finishes CQI feedback process.

FIGS. 5A and 5B are diagrams of a CQICH pattern block generation method in the wireless communication system according to the present invention.

In FIGS. 5A and 5B, the vertical axis indicates CQICH physical resources and the horizontal axis indicates frames. The CQICH pattern block is a two-dimensional block corresponding to the number of CQICHs per framex the CQICH pattern period. The individual CQICH pattern block has a different combination of element patterns constituting the two-dimensional block. In FIGS. 5A and 5B, the same colored portion is a whole CQICH sub-block. The CQICH sub-blocks are distinguished using their assigned resource indexes.

For example, the patterns 1 and 2 in the CQICH pattern block 1(5a) is a CQICH pattern allocated to the corresponding user to send the CQICH in every two frames. At one time, two CQICH resources are allocated for the large amount of feedback. At the other time, only one CQICH resource is allocated for the small amount of feedback. The pattern 7 in the CQICH pattern block 1(5a) is allocated to the user to send the CQICH in every two frames, and allocates four CQICH resources at a time. The patterns 3, 10 14 and 16 of the CQICH pattern block 1 (5a) are the patterns for the operation mode which merely allocates one CQICH resource in every eight frames. The pattern block 2 (5b) is a combination of element patterns different from the pattern block 1 (5a).

To generate the CQICH pattern block, the CQICH pattern is generated by taking into account the requirements for the required CQICH allocation period and the number of required CQICH resources for one allocation according to each operation mode. In other words, for each operation mode, the CQICH pattern is generated to signify the number of CQICH resource allocations required in every which frames in a certain frame.

Next, a CQICH pattern sequence set is generated by considering the CQICH pattern required for each operation mode. The CQICH pattern sequence set includes a plurality of CQICH pattern groups that satisfy the different CQICH allocation pattern requirements. Each CQICH pattern group includes a plurality of element pattern sequences, and each CQICH pattern corresponds to one CQICH pattern group.

For example, the CQICH pattern sequence set is generated in units of eight frames. To transmit the CQICH once every two frames to the corresponding user, the CQICH pattern first allocates two CQICH resources for a large amount of the feedback and then allocates only one CQICH resource for the small amount of remaining feedback. In this case, the CQICH pattern group can be expressed as Equation (1).

$$P_{11}=[20102010]$$

$$P_{12}=[02010201]$$

$$P_{13}=[10201020]$$

$$P_{14}=[01020102] \qquad (1)$$

When the pattern allocates only one CQICH resource per every eight frames, the CQICH pattern group can be expressed as Equation (2).

$$P_{21}=[10000000]$$

$$P_{22}=[01000000]$$

$$P_{23}=[00100000]$$

$$P_{24}=[000100000]$$

$$P_{24}=[00010000]$$

$$P_{25}=[00001000]$$

$$P_{26}=[00000100]$$

$$P_{27}=[00000010]$$

$$P_{28}=[00000001] \qquad (2)$$

When the pattern allocates only two CQICH resources per every two frames, the CQICH pattern group can be expressed as Equation (3).

$$P_{31}=[20202020]$$

$$P_{32}=[02020202] \qquad (3)$$

$P_{ij}$ denotes a j-th element pattern sequence of an i-th CQICH pattern group. The element pattern sequences in the same CQICH pattern group have equal priority.

The CQICH pattern group is determined by taking into account the CQICH allocation pattern required for each operation mode in a general condition as follows. The length of the element pattern sequence is equal to the CQICH allocation period, and a k-th item value of the element pattern sequence indicates the number of CQICHs allocated to the k-th frame. The first element pattern sequence of a specific CQICH pattern group is set to a random sequence, which meets the required CQICH allocation period and the required CQICH number of the corresponding operation mode. Every possible circular shifted sequence of the first element pattern sequence is generated and designated to the element pattern sequences of the corresponding CQICH pattern group.

Finally, a plurality of CQICH pattern blocks is generated by reflecting the different operation mode multiplexing ratios using the CQICH pattern group and the element pattern sequences. For doing so, conditions, which should be satisfied, are defined by considering the operation mode multiplexing ratios of the CQICH pattern blocks. For example, the condition of a certain CQICH pattern blocks requires the allocation of three or more $P_{1x}$ and four or more $P_{2x}$. Next, by taking into account the condition which should be satisfied for each CQICH pattern block, a pattern block satisfying Equation (4) is generated.

$$\sum_{i=1}^{N_{pattern}} \sum_{j=1}^{m_i} \rho_{ij} P_{ij} = N_{CQICH} 1 \quad (4)$$

$$\sum_{j=1}^{m_i} \rho_{ij} \geq n_i \text{ for all } i$$

The rightmost '1' in Equation (4) denotes a vector having every element being '1', and $\rho_{ij}$ denotes the allocation number of the j-th element pattern sequence of the i-th CQICH pattern group. $\rho_{ij}$ is zero or a positive number. $n_i$ denotes a minimum allocation number of the i-th CQICH pattern group, $N_{pattern}$ denotes the number of CQICH pattern groups, $N_{CQICH}$ denotes the number of CQICHs per frame, and $m_i$ denotes the number of element pattern sequences belonging to the i-th CQICH pattern group. The first line of Equation (4) signifies that the block of the number of CQICHs per frame× the CQICH pattern period in size is segmented into CQICH sub-blocks corresponding to the element pattern sequences without omission, and the second line signifies that there are at least $n_i$-ary CQICH sub-blocks corresponding to the i-th pattern group in the segmented CQICH sub-blocks.

In other words, the required CQICH patterns are generated for the different operation modes, and the CQICH pattern block corresponding to the CQICH number× the CQICH pattern period, which can allocate the patterns to the frames, is generated by combining the generated CQICH patterns.

The primary resource indexes (e.g., 1-18 of FIG. 5A, 1-20 of FIG. 5B) are assigned to the CQICH sub-blocks constituting the generated CQICH pattern block, and the CQICH pattern block indexes (e.g., the pattern 1 and the pattern 2 of FIGS. 5A and 5B) are assigned to the CQICH pattern blocks that meet the requirements of the different operation modes. The information relating to the generated CQICH pattern block is known to both of the BS and the MS.

While the CQICH pattern block index is transmitted over the downlink broadcast channel and the CQICH resource allocation message including the other CQICH allocation information is separately transmitted according to the present invention, the transmitted CQICH resource allocation message can include the CQICH pattern block index information.

When the CQICH resources are allocated using the CQICH pattern block according to the present invention, there is no need to send the information relating to the 4-bit CQICH resource number allocated to the corresponding user (CQICH_num), the 6-bit allocation position (allocation index), and the 3-bit allocation period of the CQICH allocation message information to the users in a conventional 802.16e system. While the CQICH resource allocation message including the CQICH type and feedback type information transmitted for each CQICH resource is sent in every frame, the information can be transmitted only once to reduce several bits.

While the message is dedicated for the CQICH allocation, the information sent for the CQICH allocation can be transmitted together with the allocation message for the data channel at the same time. For example, if a resource allocation message for the data channel allocation is transmitted to the corresponding user, a message including the information for the CQICH allocation can be sent together with the resource allocation message for the data channel allocation. In this case, it is possible to reduce the overhead caused by CQICH_ID and Cyclic Redundancy Check (CRC) required for sending a message for a separate CQICH allocation.

Alternatively, the information transmitted for the CQICH allocation can be piggybacked on the data. In this case, when the corresponding user has the data channel, a 1-bit indicator signifying whether the CQICH allocation is piggybacked is set and the CQICH allocation message is piggybacked.

As set forth above, the CQICH resources are patterned in advance by reflecting the required CQICH patterns of the operation modes, and the great amount of information relating to the CQICH allocation is transmitted to the MS with the single index in the wireless communication system. Therefore, the resources required for the CQICH allocation can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating a Channel Quality Information CHannel (CQICH) of a Base Station (BS) in a wireless communication system, the method comprising:
   determining, by a controller, CQICH patterns required for each user using information of one or more users to which CQICH resources are to be allocated, and selecting a CQICH pattern block including all of the determined CQICH patterns among a plurality of pre-generated CQICH pattern blocks; and
   allocating CQICH sub-blocks corresponding to the CQICH patterns required for each user using resource layout information of the CQICH sub-blocks corresponding to the CQICH patterns of the selected CQICH pattern block, and transmitting CQICH allocation information to a Mobile Station (MS), wherein the CQICH pattern includes a pattern formed using both a CQICH resource allocation period required for a user and a number of CQICH resources required for one allocation.

2. The method of claim 1, wherein the CQICH allocation information includes at least one of a user IDentification (ID), a CQICH ID, a CQICH pattern block index for distinguishing the selected CQICH pattern block, a CQICH index for distinguishing a sub-block allocated to a corresponding user in the selected CQICH pattern block, a feedback type signifying information to be transmitted over the allocated CQICH using the CQICH allocation information, a CQICH type signifying how information is mapped to the allocated CQICH through the CQICH allocation information, and a transmission duration of a corresponding pattern.

3. The method of claim 1, wherein the CQICH pattern block is a two-dimensional block corresponding to a number of CQICHs per frame×a CQICH pattern period and the information of one or more users is operation mode information of the one or more users.

4. The method of claim 3, wherein selecting the CQICH pattern block comprises:
generating a CQICH pattern group corresponding to the required CQICH pattern based on the operation mode, and generating one or more element pattern sequences for each CQICH pattern group;
selecting the CQICH pattern block by combining the element pattern sequences, wherein the element pattern sequence includes a sequence that composes a CQICH pattern sequence set generated by considering a required CQICH pattern.

5. The method of claim 4, wherein generating the one or more element pattern sequences comprises:
generating a first element pattern sequence with a certain sequence that satisfies a required CQICH period and a number of a corresponding operation mode; and
generating other element pattern sequences by shifting the generated first element pattern sequence.

6. The method of claim 4, wherein a length of the element pattern sequence is equal to the CQICH pattern period and a value of a k-th item of the element pattern sequence is a number of CQICHs allocated to a k-th frame.

7. The method of claim 4, wherein selecting the CQICH pattern block further comprises:
generating a plurality of CQICH pattern blocks by taking into account different operation mode multiplexing ratios,
assigning indexes to the generated CQICH pattern blocks.

8. The method of claim 4, wherein selecting the CQICH pattern block further comprises:
segmenting the selected CQICH pattern blocks into sub-blocks corresponding to the element pattern sequences respectively; and
assigning indexes to the segmented sub-blocks.

9. The method of claim 4, wherein the CQICH pattern block meets the following equation:

$$\sum_{i=1}^{N_{pattern}} \sum_{j=1}^{m_i} \rho_{ij} P_{ij} = N_{CQICH} 1$$

$$\sum_{j=1}^{m_i} \rho_{ij} \geq n_i \text{ for all } i$$

wherein a rightmost '1' denotes a vector having every element being '1', $\rho_{ij}$ denotes an allocation number of a j-th element pattern sequence of an i-th CQICH pattern group, $\rho_{ij}$ is zero or a positive number, $n_i$ denotes a minimum allocation number of the i-th CQICH pattern group, $N_{pattern}$ denotes the number of CQICH pattern groups, $N_{CQICH}$ denotes a number of CQICHs per frame, $m_i$ denotes a number of element pattern sequences belonging to the i-th CQICH pattern group, a first line the equation signifies that the block of the number of CQICHs per frame×the CQICH pattern period in size is segmented into CQICH sub-blocks corresponding to the element pattern sequences without omission, and a second line signifies that there are at least $n_i$-ary CQICH sub-blocks corresponding to the i-th pattern group in the segmented CQICH sub-blocks.

10. The method of claim 1, further comprising:
generating a CQICH resource allocation message including the CQICH allocation information; and
transmitting the generated CQICH resource allocation message together with a data channel resource allocation message to a user or piggybacking the generated CQICH resource allocation message on data and transmitting the data to a user.

11. The method of claim 1, further comprising:
generating a CQICH resource allocation message including the CQICH allocation information and transmitting the generated CQICH resource allocation message to a user.

12. An apparatus for allocating a Channel Quality Information CHannel (CQICH) of a Base Station (BS) in a wireless communication system, comprising:
a CQICH pattern storage memory for storing resource layout information of CQICH patterns based on CQICH pattern blocks; and
a controller for determining CQICH patterns required for each user using information of one or more users to which CQICH resources are to be allocated, selecting one CQICH pattern block including all of the determined CQICH patterns from a plurality of pre-generated CQICH pattern blocks, reading resource layout information of CQICH sub-blocks corresponding to CQICH patterns of the selected CQICH pattern block from the CQICH pattern storage memory, and allocating the CQICH sub-blocks corresponding to the CQICH patterns required for each user using the read information, wherein the CQICH pattern includes a pattern formed using both a CQICH resource allocation period required for a user and a number of CQICH resources required for one allocation.

13. The apparatus of claim 12, wherein the CQICH pattern block is generated by taking into account CQICH patterns required for operation modes.

14. The apparatus of claim 13, wherein the CQICH pattern block is a two-dimensional block corresponding to a number of CQICHs per frame×a CQICH pattern period and information of the user is operation mode information of the user.

15. The apparatus of claim 14, wherein the CQICH pattern block meets the following equation:

$$\sum_{i=1}^{N_{pattern}} \sum_{j=1}^{m_i} \rho_{ij} P_{ij} = N_{CQICH} 1$$

$$\sum_{j=1}^{m_i} \rho_{ij} \geq n_i \text{ for all } i$$

wherein a rightmost '1' denotes a vector having every element being '1', $\rho_{ij}$ denotes an allocation number of a j-th element pattern sequence of an i-th CQICH pattern group, $\rho_{ij}$ is zero or a positive number, $n_i$ denotes a minimum allocation number of the i-th CQICH pattern group, $N_{pattern}$ denotes a number of CQICH pattern groups, $N_{CQICH}$ denotes a number of CQICHs per frame, $m_i$ denotes a number of element pattern sequences belonging to the i-th CQICH pattern group, a first line the equation signifies that a block of the number of CQICHs per frame×the CQICH pattern period in size is segmented into CQICH sub-blocks corresponding to the element pattern sequences without omission, and a second line signifies that there are at least $n_i$-ary CQICH sub-blocks corresponding to the i-th pattern group in the segmented CQICH sub-blocks, wherein the element pattern sequence includes a sequence that composes a CQICH pattern sequence set generated by considering a required CQICH pattern.

16. The apparatus of claim 12, further comprising:
a scheduler for determining one or more users to which a CQICH resource is to be allocated through a scheduling; and
a CQICH resource allocation message generator for generating a CQICH resource allocation message including CQICH allocation information input from the controller, and transmitting the generated CQICH resource allocation message to a user,
wherein the controller outputs the CQICH allocation information according to the CQICH sub-block allocation to the CQICH resource allocation message generator.

17. The apparatus of claim 16, wherein the CQICH resource allocation message generator transmits to the user the generated CQICH resource allocation message together with a data channel resource allocation message or by piggybacking the message to data.

18. The apparatus of claim 16, further comprising:
a broadcast message sender for transmitting a CQICH pattern block index input from the controller to the user over a broadcast channel,
wherein, periodically or when the CQICH pattern block needs to change, the controller outputs an index of the selected CQICH pattern block to the broadcast message sender.

19. The apparatus of claim 16, wherein the CQICH allocation information includes at least one of a user IDentification (ID), a CQICH ID, a CQICH pattern block index for distinguishing a selected CQICH pattern block, a CQICH index for distinguishing a sub-block allocated to a corresponding user in the selected CQICH pattern block, a feedback type signifying information to be transmitted over an allocated CQICH using the CQICH allocation information, a CQICH type signifying how information is mapped to the allocated CQICH through the CQICH allocation information, and a transmission duration of a corresponding pattern.

\* \* \* \* \*